March 26, 1940.  W. DÄLLENBACH  2,194,886

FUSED JOINT

Filed Dec. 13, 1937

Inventor:
Walter Dällenbach
by
Atty

Patented Mar. 26, 1940

2,194,886

UNITED STATES PATENT OFFICE 2,194,886

FUSED JOINT

Walter Dällenbach, Berlin-Charlottenburg, Germany, assignor to Julius Pintsch Kommanditgesellschaft, Berlin, Germany Application December 13, 1937, Serial No. 179,588
In Germany December 29, 1936

4 Claims. (Cl. 250—27.5)

This invention relates to the connection of a metal part and a ceramic body, especially a steatite body, by fusion. It relates particularly to cases in which a metal part is contracted upon a ceramic body having a cylindrical adhering surface of a height in an axial direction less than its diameter and in which the joint is subjected during working or during preparation for working to temperatures of the order of magnitude of several hundred degrees.

According to the invention such a fused joint is made by providing on the edge of the metal part to be joined to the ceramic body an excess of material which prevents the pressure stresses at the joint from being converted into tension stresses along the axial extension of the adhering surface.

This is preferably effected either by prolonging the edge of the metal part beyond the adhering surface or by providing it with a rim in a radial direction; in some circumstances both expedients may be used together.

The invention is illustrated by the accompanying drawing, of which:

Figure 1:
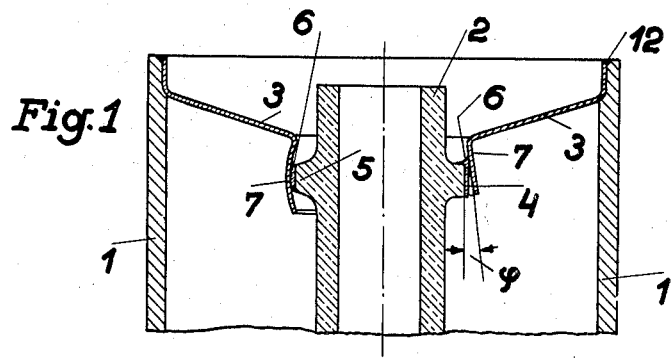
Figure 1 is a longitudinal section of a part of an electrode leading-in tube, for example for vacuum discharge apparatus, by means of which will be explained the changes of form of the metal parts to which the invention relates.

In Figure 1, I indicates a part of the envelope of a metal vacuum vessel, for example a mercury-vapour rectifier, into which there is to be inserted from above a ceramic tube 2, in particular a steatite tube, which serves for the reception of the lead of an electrode. This ceramic tube 2 is connected in a vacuum-tight manner with an annular part 3 consisting of a metal sheet of suitable composition, for example of alloys of nickel, chromium, vanadium, with iron, or chromium-nickel alloys, the adhering surface 4 formed by an annular projection 5 of the tube 2 being fused to the flange 7 of the annular part 3 by means of an interposed mass of glass or enamel flux 6 (hereinafter called glass flux). Instead of an enamel flux there may be used a burning or firing or vitrifying process. The annular part 3 is finally welded to the wall I of the vessel at 12.

The heat-expansion co-efficients of the ceramic body, the flux, and the metal part 3 are in this case so related that the ceramic body and the flux have as nearly as possible equal co-efficients of expansion, whilst that of the metal part is somewhat greater in order to produce a contraction that increases the strength of the connection.

Now it has been found that in such a case there is the danger that deformation of the annular flange 7 resulting from the contraction stress may give rise to tension stresses in the adhering surface. Such tension stresses in the adhering surface are to be feared particularly when the adhering surface is comparatively short in the axial direction in comparison with the diameter at the joint, which, on the other hand, is favourable as regards possible thrust stresses.

Now, by the contraction that occurs and the tension stresses possibly arising therefrom, the flange 7 is deformed conically in the way shown in the right-hand portion of Figure 1. The generatrix of the peripheral surface here makes an angle $\phi$ with the axis of the tube. This is to be attributed to the fact that in consequence of the shortness of the axial length of the adhering surface there is at the lower end of the flange 7, (inasmuch as this end, as is usual, is flush with the annular projection 5) not sufficient material to contract the lower portion of the flange 7 with sufficient force upon the annular projection 5. Now this conical deformation of the flange 7 has the result that at the lower end of the flange 7 the fused joint between the metal, the glass, and the ceramic body begins to open, and in fact generally in the glass. This is apt to cause a leak, or at least a considerable weakening of the joint.

Now if the metal flange 7 is in accordance with the invention prolonged beyond the annular projection, as is shown in the left-hand side of Figure 1, the deformation of the flange 7 exhibits itself as a barrel-shaped arching of the flange, and the middle tangent of the deformed flange 7 remaining parallel to the axis of the tube, so that no dangerous tension stresses can occur at the adhering surface (the representation in Figure 1 is of course exaggerated).

Figure 2:
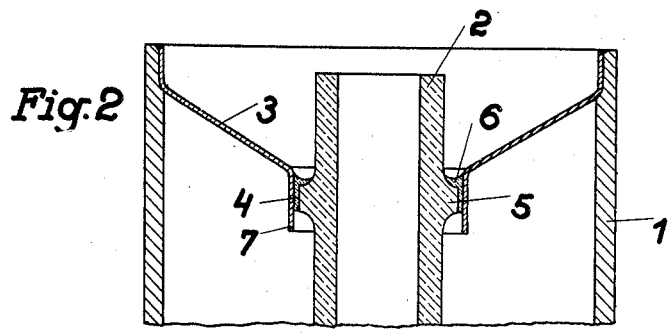
Figures 2, 3 and 4 show constructional examples of the invention, and, in fact, represent parts of electrode leading-in devices for current rectifiers.

Figure 2 shows an example of a joint in which according to the invention the anular flange 7 is prolonged beyond the annular projection 5.

Figure 3:
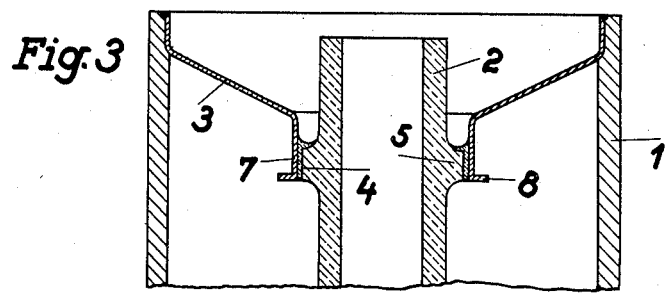

It is however not necessary to produce the advantageous barrel-like deformation of the flange 7 by prolongation of the flange, but, as shown in Figure 3 the flange 7 may be rimmed radially. In consequence of the rim 8 thus produced there is then, notwithstanding the flush termination of the flange 7 and the annular projection 5, sufficient material to prevent the conical deformation of the flange 7 represented in the right-hand portion of Figure 1.

Figure 4:
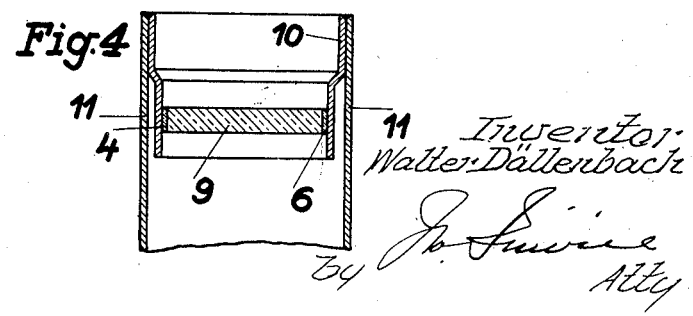

In the case of the example represented in Figure 4, instead of the ceramic tube 2, a ceramic disc 9 which is to be regarded as at the level of the annular projection 5 is to be fused, with interposition of a flux 6 to a cylindrical tubular part 10, which widens out for example slightly in an upward direction. The securing of the necessary excess of material at the joint is effected by a prolongation of the tubular part 10. Instead of this, however, a rim may be used. The tubular part 10 is then welded to a wider tube 11.

The invention is of course not restricted to the constructional examples here given, but may be used also in similar cases, in particular for a high-vacuum vessel with a metal wall. The distribution of the metal should always be so chosen that the metal part will be pressed over its entire adhering surface upon its ceramic support and conversion of the pressure stress into tension stress along the axial extension of the adhering surface cannot occur.

What I claim is:

1. An electrode lead-in for vacuum discharge apparatus, comprising a wall forming the envelope of the apparatus, a metal part connected to said wall, a tubular ceramic insulator to accommodate the current supplying conductor, said insulator having on its outer surface an annular extension, the metal part having an annular terminal surrounding the annular extension of the insulator and joined vacuum-tight to said extension by shrinking and by fusion, said terminal extending in both directions beyond the annular extension of the insulator and clear of the insulator in such extension.

2. An electrode lead-in according to claim 1, wherein the vacuum-tight joint between the metal part and the extension of the ceramic insulator are connected by the employment of a melting flux.

3. An electrode lead-in according to claim 1, wherein the axial dimension of the projection of the ceramic insulator is smaller than the diameter of such extension.

4. An electrode lead-in for vacuum discharge apparatus, comprising a wall forming the envelope of the apparatus, a metal body extending therefrom, a tubular insulator of ceramic material to accommodate a conductor to an electrode of the apparatus, the ceramic insulator having an annular raised part, the metal body having a greater expansion coefficient than the ceramic insulator and provided with a cylindrical extension joined vacuum-tight to the outer surface of the annular raised portion of the ceramic insulator by shrinking, said cylindrical extension projecting clear of the ceramic insulator beyond both edges of the raised part thereof, one at least of said extensions being bent in radial direction at right angles.

WALTER DÄLLENBACH.